G. B. BRIMINGHAM.
Sub-Soil Plows.
No. 140,460.   Patented July 1, 1873.
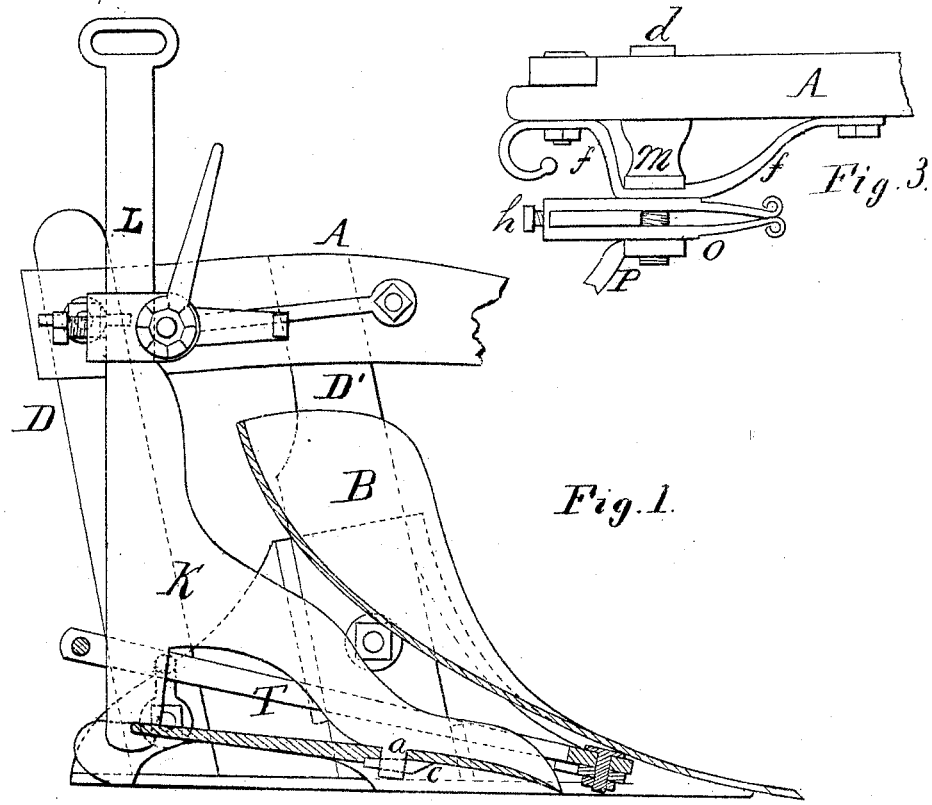
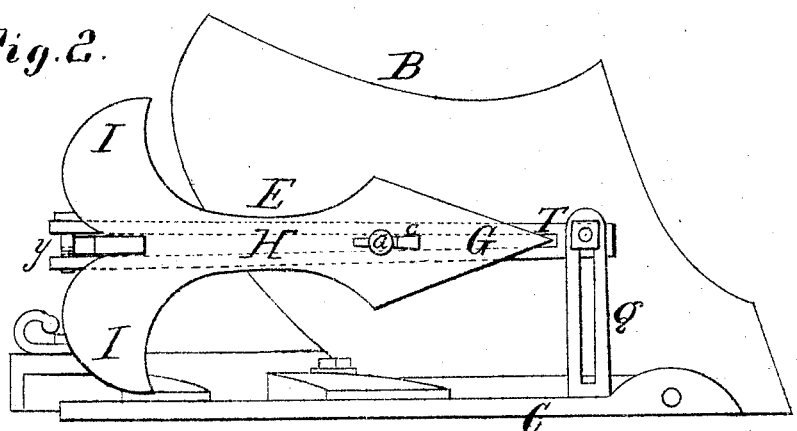
Witnesses.
E. R. Bates.
George E. Upham.
Inventor.
Green B. Brimingham.
Chipman Hosmer & Co.
Attorneys.

UNITED STATES PATENT OFFICE.

GREEN B. BRIMINGHAM, OF TRENTON, TENNESSEE.

IMPROVEMENT IN SUBSOIL-PLOWS.

Specification forming part of Letters Patent No. 140,460, dated July 1, 1873; application filed November 9, 1872.

*To all whom it may concern:*

Be it known that I, GREEN B. BRIMINGHAM, of Trenton, in the county of Gibson and State of Tennessee, have invented a new and valuable Improvement in Subsoil-Plows; and I do hereby declare that the following is a full, clear, and exact description of the construction and operation of the same, reference being had to the annexed drawings making a part of this specification, and to the letters and figures of reference marked thereon.

Figure 1 of the drawings is a representation of a top view of my subsoil-plow. Fig. 2 is a side view of same.

This invention has relation to subsoiling and underdraining attachments for plows; and it consists in the construction and novel arrangement of the winged convex-pointed subsoil base or foot, and the devices for connecting the subsoiler to an ordinary plow. The subsoiler is designed to move directly in the rear of the turning-plow, and through and below the furrow formed by the latter.

A of the drawings represents the beam, B the mold-board, C the land-side, and D D' the standards, of an ordinary plow. To such a plow I attach or detach, at will, the devices hereinafter mentioned.

The letter E represents a subsoil-plow having a convex diamond-shaped point, G, connected by a narrow raised neck, H, to a pair of scoop-shaped wings, I. The point, neck, and wings are sharpened on their edges to enable them to pass easily through the soil. The rear ends of the wings or blades I are sufficiently elevated to cause them to serve as additional and auxiliary looseners of the earth, already partially pulverized by the point and central ridge. The wings serve not only as pulverizers, but also as auxiliary plows, in aid of the point and ridge. They also aid in securing vertical position for the entire apparatus while it is being moved through the soil. K represents a cutter or cutting brace, which extends from the standard L, of which it forms a part, and is attached to the subsoiler in the manner shown on Figs. 1 and 2 of the drawings. This cutter resembles, in general outline, or rather, in side view, an ordinary boot having a long heel in which is formed a recess adapted to receive the rear end of the subsoiler. It also has a lug, *a*, which passes through the subsoiler, and is firmly attached thereto by means of the key *c*. I make the front edge of this cutter, from its extreme point to a point nearly parallel with the plow-beam, quite sharp, for the purpose of readily passing through the soil, and cutting roots and other obstructions of that character. The letter M represents a bolt, which passes through the plow-beam, and is held in place and made removable by means of a screw-thread and nut at *d*. The right-hand side of this bolt has a shoulder, which abuts against the plow-beam, and it is strengthened in its position by means of the removable braces *f f*, arranged and secured as shown on Fig. 3. The letter O represents a clamp, through which the standard L is passed, and in which it is secured in the position desired by means of the clamping-nut and wrench P and the set-screw *h*.

The point of my subsoiler is made adjustable, either to the right or left, by the means following, that is to say: The letter Q represents a slotted bar, the left end of which is secured to the land-side of the plow by a screw and nut, or other convenient means; and the letter T represents a slotted frame or guide-bars, united at their front ends, and provided with a bolt, which passes downward through the slot in bar Q, and made secure and adjustable therein by a thread and nut, as shown. This frame T has such width and length of slot as will serve to clasp the cutter, as represented, and it has a screw-bolt passing through the rear end of its bars and a nut arranged on said bolt, as shown at Y. To unite this frame with the plow I attach an arm or rod to the side of the left-hand bar, and extend it to the rear plow-standard, where it is attached and made removable by a nut and screw, in the usual manner of attaching such devices.

It will readily be seen that, by the means above described, the subsoiler is made adjustable, both laterally and vertically, at will, and that an ordinary plow may be converted into a subsoil-plow with comparatively small labor.

I claim as my invention—

1. The subsoiler, as described, having the diamond-shaped point G, raised neck H, and scoop-shaped wings I, substantially as described and shown.

2. The slotted and removable bar Q in combination with the guiding-frame T, having removable and clamping bolt Y, and united with the plow-standard by a detachable arm, substantially as shown and described.

3. The clamp O, wrench P, and set-screw $h$, in combination with the standard L and removable bolt M, constructed and arranged substantially as and for the purpose herein specified.

In testimony that I claim the above I have hereunto subscribed my name in the presence of two witnesses.

GREEN B. BRIMINGHAM.

Witnesses:
R. N. DAVIS,
J. M. ELDER.